(12) United States Patent
Xue et al.

(10) Patent No.: US 10,200,497 B2
(45) Date of Patent: *Feb. 5, 2019

(54) DISTRIBUTED DATA-BASED CONCURRENT PROCESSING METHOD AND SYSTEM, AND COMPUTER STORAGE MEDIUM

(71) Applicant: TENCENT TECHNOLOGY (SHENZHEN) COMPANY LIMITED, Shenzhen (CN)

(72) Inventors: Kouying Xue, Shenzhen (CN); Dafu Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,147

(22) Filed: May 21, 2018

(65) Prior Publication Data

US 2018/0270323 A1 Sep. 20, 2018

Related U.S. Application Data

(63) Continuation of application No. 14/615,715, filed on Feb. 6, 2015, now Pat. No. 10,009,441, which is a (Continued)

(30) Foreign Application Priority Data

Sep. 19, 2012 (CN) .......................... 2012 1 0349311

(51) Int. Cl.
*G06F 15/16* (2006.01)
*H04L 29/08* (2006.01)
(Continued)

(52) U.S. Cl.
CPC ............ *H04L 67/32* (2013.01); *G06F 9/5027* (2013.01); *H04L 67/1006* (2013.01); *H04L 67/1008* (2013.01); *H04L 67/42* (2013.01)

(58) Field of Classification Search
CPC ..... H04L 29/06; H04L 29/08; H04L 67/1008; H04L 67/1006; H04L 67/42; H04L 67/32; G06F 9/5027

See application file for complete search history.

(56) References Cited

U.S. PATENT DOCUMENTS 6,445,679 B1 9/2002 Taniguchi
7,373,466 B1 5/2008 Conway
(Continued)

FOREIGN PATENT DOCUMENTS

CN 101216782 A 7/2008
CN 102156659 A 8/2011

OTHER PUBLICATIONS

Chinese Office Action dated Sep. 1, 2016 in corresponding Chinese Patent Application No. 201210349311.X (5 pages).
(Continued)

*Primary Examiner* — Benjamin M Thieu
(74) *Attorney, Agent, or Firm* — Staas & Halsey LLP

(57) ABSTRACT

A distributed data-based concurrent processing by a control terminal obtaining data block information corresponding to a submitted operation; a task processing terminal sending a task processing request to the control terminal; the control terminal finding a data block that is unassigned and is distributed in the same server where the task processing terminal is distributed, and assigning the found data block to the task processing terminal. The control terminal determines a server having the fewest data blocks that are being processed by the task processing terminal and assigning an unassigned data block to the task processing terminal on the determined server if the data block that is unassigned and is
(Continued)

distributed in the same server where the task processing terminal is distributed is not found. The task processing terminal processes the data block assigned by the control terminal according to a flow.

13 Claims, 11 Drawing Sheets

Related U.S. Application Data continuation of application No. PCT/CN2013/083281, filed on Sep. 11, 2013.

(51) Int. Cl.
*G06F 9/50* (2006.01)
*H04L 29/06* (2006.01)

(56) References Cited

U.S. PATENT DOCUMENTS

| 2005/0243831 | A1 | 11/2005 | Zhang |
| 2012/0057547 | A1 | 3/2012 | Lohr |
| 2012/0179868 | A1 | 7/2012 | Haustein |
| 2013/0159605 | A1 | 6/2013 | Lau |
| 2013/0238851 | A1 | 9/2013 | Chang |
| 2014/0064392 | A1 | 3/2014 | Jonsson |

OTHER PUBLICATIONS

International Search Report dated Dec. 19, 2013 in corresponding PCT Application No. PCT/CN2013/083281 (2 pages) (2 pages English Translation).

Non-Final Office Action dated Feb. 24, 2017 in parent U.S. Appl. No. 14/615,715 (20 pages).

Final Office Action dated Jul. 26, 2017 in parent U.S. Appl. No. 14/615,715 (25 pages).

Advisory Action dated Nov. 8, 2017 in parent U.S. Appl. No. 14/615,715 (4 pages).

Notice of Allowance dated Feb. 27, 2018 in parent U.S. Appl. No. 14/615,715 (8 pages).

U.S. Appl. No. 14/615,715, filed Feb. 6, 2015, Kouying Xue et al., Tencent Technology (Shenzhen) Company Limited Shenzhen, P.R. China.

US 10,200,497 B2

1

DISTRIBUTED DATA-BASED CONCURRENT PROCESSING METHOD AND SYSTEM, AND COMPUTER STORAGE MEDIUM

CROSS-REFERENCE TO RELATED APPLICATIONS

The present application is a U.S. continuation application of U.S. patent application Ser. No. 14/615,715, filed Feb. 6, 2015, which is a U.S. continuation application under 35 U.S.C. § 111(a) claiming priority under 35 U.S.C. §§ 120 and 365(c) to International Application PCT/CN2013/083281, filed Sep. 11, 2013, and claims foreign priority to Chinese application 201210349311.X filed Sep. 19, 2012, and which are incorporated herein by reference in their entireties.

FIELD OF THE INVENTION

The present invention relates to data processing technique fields, more particularly, to a distributed data-based concurrent processing method and system, and a computer storage medium.

BACKGROUND OF THE INVENTION

Along with information and communication technique development, an era of big data has come. Data amount needed to store in every industry has become bigger and bigger, especially for the industry in need of storing huge user data, such as finance, telecom, network communication service (email, instant messaging), social networking service (microblog, forum), etc.

Generally, the big data are distributedly stored in a number of servers. Number of the server that stores the big data may be thousands or ten thousand. These servers may be located in one or more server groups, or in one or more data processing centers. A data storage way of some databases is a distributed storage way too, such as xcube database. Xcube is a distributed NoSQL database, and it divides a data table with big data amount into a number of sub tables, stores the sub tables into a number of servers and records sub table information into a routing table. The sub table information includes a start line key value, an end line key value, data amount of the sub table and a server where the sub table is located. The start line key value and the end line key value of the sub table mean respective values of main keys of a start line and an end line of the sub table. The sub table includes all records between a location in a father data table corresponding to the start line key value and a location in the father data table corresponding to the end line key value.

Fast processing of the big data is a problem that people face. Processing way of multithreading and multitask can concurrently process data that a single device stores. However, how to coordinate servers in the server group to concurrently process distributed big data and increase processing speed of big data is a problem to be solved.

SUMMARY OF THE INVENTION

Accordingly, it is necessary to provide a distributed data-based concurrent processing method capable of quickly concurrently-processing distributed data.

A distributed data-based concurrent processing method includes the following steps:

a control terminal obtaining data block information corresponding to a submitted operation;

a task processing terminal sending a task processing request to the control terminal;

the control terminal finding a data block that is unassigned and is distributed in the same server where the task processing terminal is distributed, and assigning found data block to the task processing terminal;

the control terminal counting a server having the fewest data blocks that are being processed by the task processing terminal and assigning an unassigned data block on the server to the task processing terminal if the data block that is unassigned and is distributed in the same server where the task processing terminal is distributed is unfound; and the task processing terminal processing the data block assigned by the control terminal according to a preset flow.

Accordingly, it is necessary to provide a distributed data-based concurrent processing system capable of quickly concurrently-processing distributed data.

A distributed data-based concurrent processing system includes a control terminal and a number of task processing terminals; the control terminal includes an initialization module and a task assigning module.

The initialization module is configured to obtain data block information corresponding to a submitted operation.

The task processing terminal is configured to send a task processing request to the control terminal.

The task assigning module is configured to find a data block that is unassigned and is distributed in the same server where the task processing terminal is distributed, and assigning found data block to the task processing terminal.

The task assigning module is further configured to count a server having the fewest data blocks that are being processed by the task processing terminal, and assign an unassigned data block on the server to the task processing terminal if the data block that is unassigned and is distributed in the same server where the task processing terminal is distributed is unfound.

The task processing terminal is further configured to process the data block assigned by the control terminal according to a preset flow.

In the distributed data-based concurrent processing method and system, the control terminal can assign distributedly-stored data to different task processing terminals to process, thereby achieving concurrent processing of the distributed data. Furthermore, in the method and system, the control terminal firstly assigns the data block to the task processing terminal distributed in the same server where the data block is distributed. The task processing terminal processes the data block stored in itself in priority, thereby increasing a processing speed of the data block and an entire speed of the concurrent processing. In addition, when there is no unassigned data block distributed in the same server where the task processing terminal is distributed, unassigned data block on a server having the fewest data blocks that are being processed is assigned to the task processing terminal. This can increase data block processing speed of the task processing terminal. Because number of the data block that is processed by the task processing terminal in the server that stores data blocks is small, it indicates that number of the task processing terminal that interacts with the server is small. The server is idle. When processing the data block on the idle server, a response speed of the server is fast and data processing speed is fast accordingly, thereby increasing an entire speed of the concurrent processing.

DETAILED DESCRIPTION OF THE EMBODIMENTS

In the present invention, a control terminal interacts with a number of task processing terminals. The control terminal assigns tasks to the task processing terminals. The task processing terminal processes the task that the control terminal assigns. Preferably, the control terminal and the task processing terminals deploy in different servers. Further preferably, one task processing terminal deploys in one server.

Figure 1:
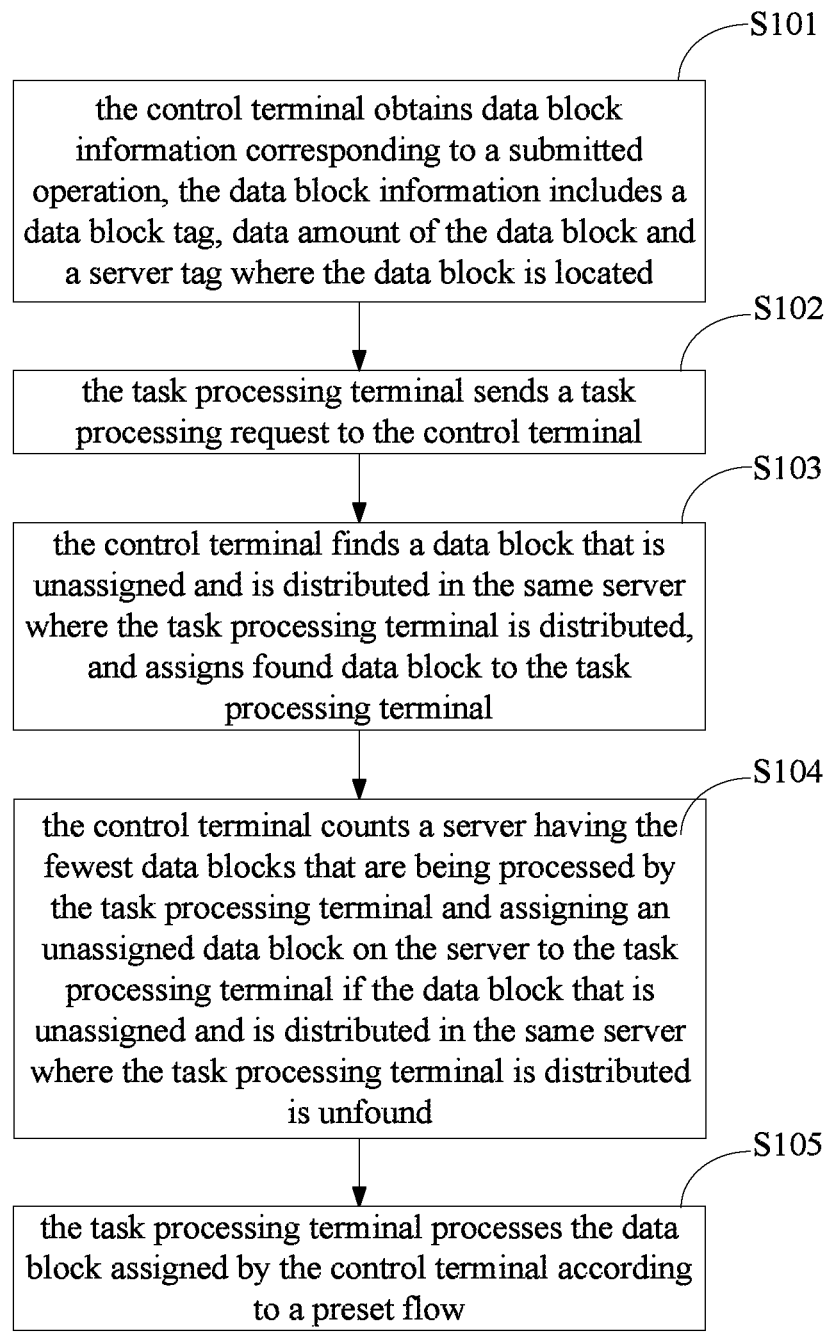
FIG. 1 is a flow diagram of a distributed data-based concurrent processing method according to an embodiment.

As shown in FIG. 1, in an embodiment, a distributed data-based concurrent processing method includes the following steps:

Step S101, the control terminal obtains data block information corresponding to a submitted operation.

Specifically, a data block corresponding to the operation can be a file block or a data table distributedly stored in a number of servers. In an embodiment, the data block information includes at least one item selected from a data block tag, data amount of the data block or a server tag where the data block is located. Specifically, the data block tag can be a storage address of the file block or a table name of the data table. The server tag can be a server IP address.

In an embodiment, in step S101, the data block information corresponding to the submitted operation can be obtained from a data management system that manages the data block corresponding to the submitted operation.

In an embodiment, the submitted operation can be a data table of xcube database, and a data table name and a key range in the data table are used for tags to indicate that records within the key range in the data table are a to-be-processed operation. The key range consists of a start line key value and an end line key value that are to be processed in the data table. In step S101, the sub table information can be found in a routing table where xcube stores the sub table information according to the data table name and the key range to obtain the start line key value, the end line key value, the data amount of the sub table and the server tag wherein the sub table is located corresponding to the operation. In an embodiment, a sub table tag consists of the data table name and the start line key value and/or the end line key value corresponding to the sub table.

Step S102, the task processing terminal sends a task processing request to the control terminal.

In an embodiment, after the control terminal is powered on, a tag of the control terminal can be written into a designated file or can be sent to a preset system that manages control terminal tags. Specifically, the tag of the control terminal can consist of a server address where the control terminal is located, a port number of the control terminal and a timestamp. After the task processing terminal is powered on, the tag of the control terminal can be read from the designated file or can be obtained from the preset system that manages the control terminal tags. After obtaining the tag of the control terminal, the task processing terminal can send a registration package to the control terminal. After successfully registered, the task processing terminal can send a heartbeat package in a predetermined frequency to the control terminal. After receiving the heartbeat package, the control terminal can scan whether there are data blocks that can be assigned, and if yes, send a response package indicating there being data blocks that can be assigned to the task processing terminal. After receiving the response package indicating there being data blocks that can be assigned, the task processing terminal can send the task processing request to the control terminal.

Specifically, the task processing request includes a server tag where the task processing terminal is located. Specifically, the server tag is an IP address of a server.

Step S103, the control terminal finds a data block that is unassigned and is distributed in the same server where the task processing terminal is distributed, and assigns found data block to the task processing terminal.

Figure 2:
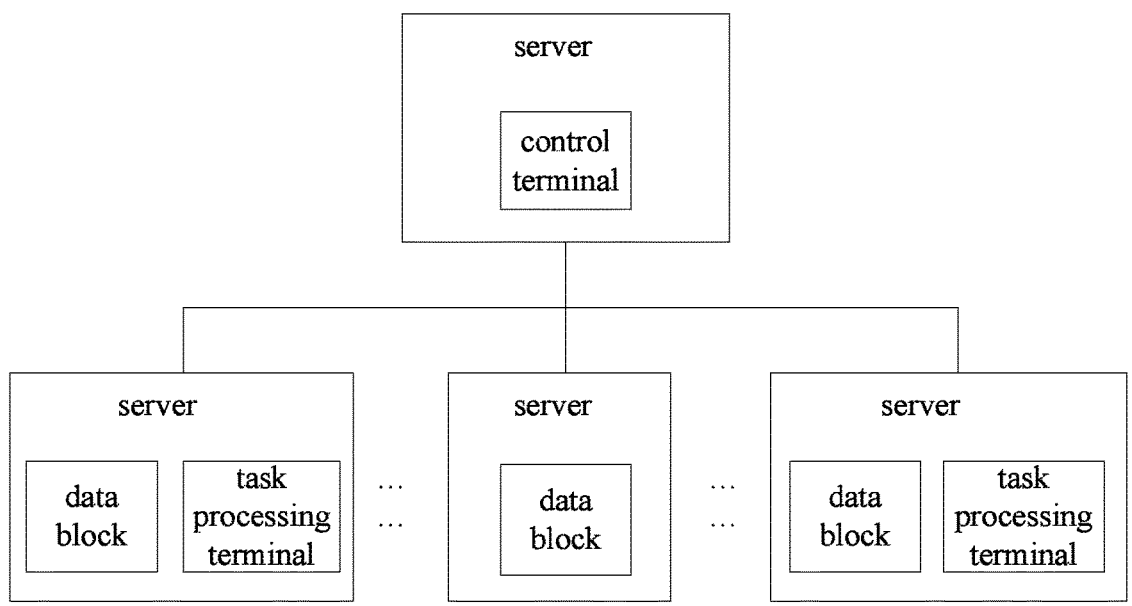
FIG. 2 is a deployment diagram of a control terminal and task processing terminals according to an embodiment.

As shown in FIG. 2, in an embodiment, the control terminal, the task processing terminal and the data block corresponding to the submitted operation are distributed in the same server group or in the same data processing center. The task processing terminal and the data block corresponding to the operation may be distributed in the same server.

Specifically, the control terminal can find the data block that is unassigned and is distributed in the same server where the task processing terminal is distributed in the data block information corresponding to the operation. Preferably, the control terminal can find a data block with the biggest data amount in data blocks that are unassigned and are distributed in the same server where the task processing terminal is distributed. In the embodiment, processing the data block with the biggest data amount in priority can avoid a long-tail effect, thereby increasing an entire concurrent processing speed. The so-called long-tail effect means that: it takes a long time to finish a few last-left data blocks with big data amount, and one data block is processed by one task processing terminal, and only a few task processing terminals work within a long time that it takes to process the last-left data blocks, and most of the task processing terminals may be idle. This causes a low degree of concurrency, thereby reducing the entire processing speed.

Specifically, the control terminal can send a data block tag, a data amount of a found data block and a server tag where the found data block is located to the task processing terminal.

Step S104, the control terminal counts a server having the fewest data blocks that are being processed by the task processing terminal and assigning an unassigned data block on the server to the task processing terminal if the data block that is unassigned and is distributed in the same server where the task processing terminal is distributed is unfound.

Preferably, the control terminal can assign a data block with the biggest data amount on the server having the fewest data blocks that are being processed by the task processing terminal to the task processing terminal. For the same reason, in the embodiment, assigning the data block with the biggest data amount to the task processing terminal in priority can avoid the long-tail effect, thereby increasing the entire speed of the concurrent processing.

Step S105, the task processing terminal processes the data block assigned by the control terminal according to a preset flow.

Specifically, after receiving the data block information sent by the control terminal, the task processing terminal can establish communication with a server where the data block is located, process data in the data block according to the preset flow and store an intermediate processing result and a final processing result.

Figure 3:
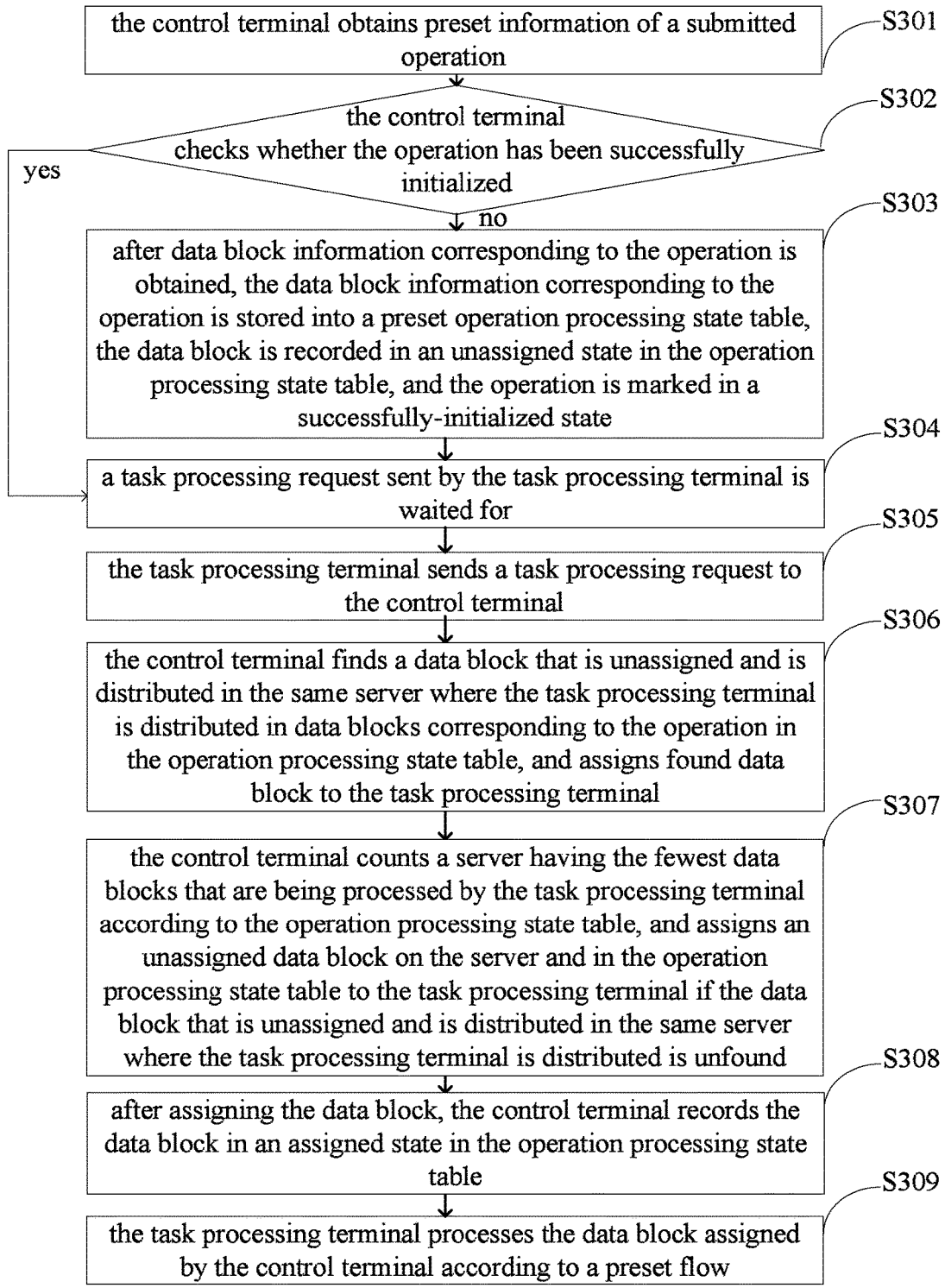
FIG. 3 is a flow diagram of a distributed data-based concurrent processing method according to another embodiment.

As shown in FIG. 3, in an embodiment, a distributed data-based concurrent processing method includes the following steps:

Step S301, the control terminal obtains preset information of a submitted operation.

Specifically, the preset information of the operation includes an operation tag. In an embodiment, the submitted operation can be a data table of xcube database. The operation tag consists of a data table name and a key range in the data table. Records within which segment of the key range in which data table can be determined as to-be-processed operation according to the operation tag.

Step S302, the control terminal checks whether the operation has been successfully initialized, executes step S303 if not, and executes step S304 if yes.

In an embodiment, the control terminal can determine whether the operation corresponding to the preset information in the designated file is marked in a successfully-initialized state. In another embodiment, the control terminal can inquire whether the operation corresponding to the preset information has been successfully initialized from a preset system that manages interruption-recovery information of the control terminal. Specifically, the preset system that manages interrupt-recovery information of the control terminal and the preset system that manages the control terminal tags are the same system.

In an embodiment, after the control terminal is powered on, whether the submitted operation having been successfully initialized is firstly checked. If not, it indicates that the control terminal is initially powered on, and then step S303 is executed to initialize the operation. If the submitted operation has been successfully initialized, it indicates that the control terminal hangs or is interrupted previously because of failure when processing operations, and when the control terminal is powered on again currently, initializing the submitted operation is not needed.

Step S303, data block information corresponding to the operation is obtained, the data block information corresponding to the operation is stored into a preset operation processing state table, the data block is recorded in an unassigned state in the operation processing state table, and the operation is marked in a successfully-initialized state.

Specifically, the operation processing state table includes fields (columns): main key, data block tag, data amount of data block, server tag where the data block is located and a processing state. In an embodiment, the main key of the operation processing state table can consist of the tag of the control terminal and a sole series number. Specifically, the sole series number of the data block is an increasing series number beginning from 1. In an embodiment, field value of the processing state includes an unassigned state, an assigned state, an error state and a complete state. The control terminal can store data block information of each data block into a field corresponding to one record in the operation processing state table, generate the sole series number of the data block by increasing from 1, combine the tag of the control terminal with the sole series number to obtain the main key of the record and mark the processing state of the record in "unassigned state".

Step S304, a task processing request sent by the task processing terminal is waited for.

Step S305, the task processing terminal sends a task processing request to the control terminal.

Specifically, the task processing request includes a server tag where the task processing terminal is located.

Step S306, the control terminal finds a data block that is unassigned and is distributed in the same server where the task processing terminal is distributed in data blocks corresponding to the operation in the operation processing state table, and assigns found data block to the task processing terminal.

Specifically, the control terminal can find a record that is in an unassigned state and whose server tag where the data block is located in the operation processing state table is the same as the server tag where the task processing terminal is located and included in the task processing request, and send data information in the found record to the task processing terminal.

Step S307, the control terminal counts a server having the fewest data blocks that are being processed by the task processing terminal according to the operation processing state table, and assigns an unassigned data block on the server and in the operation processing state table to the task processing terminal if the data block that is unassigned and is distributed in the same server where the task processing terminal is distributed is unfound.

Specifically, the control terminal can count number of record whose processing state corresponding to the server tag where each data block is located is an assigned state, obtain a server having the fewest number of record correspondingly in servers having unassigned data blocks, further send data block information of the unassigned data block on the server to the task processing terminal. Preferably, data block information of an unassigned data block with the smallest data amount is sent to the task processing terminal.

Step S308, after assigning the data block, the control terminal records the data block in an assigned state in the operation processing state table.

Specifically, field of the processing state in the record corresponding to the data block can be set in "assigned state". In an embodiment, the operation processing state table further includes a field that is used for recording a server tag where the task processing terminal that the data block is assigned to is located. After assigning the data block, the control terminal can record the server tag where the task processing terminal that the data block is assigned to is located into the field correspondingly in the operation processing state table.

Step S309, the task processing terminal processes the data block assigned by the control terminal according to a preset flow.

In the distributed data-based concurrent processing method, the control terminal records the data block information and the processing state of the data block corresponding to the submitted operation in the operation processing state table, and assigns the data block to the task processing terminal according to the processing state of the data block in the operation processing state table. If the control terminal hangs or is interrupted because of failure, after powered on again, the control terminal still assigns the data block according to the processing state of the data block corresponding to the operation in the operation processing state table. It is unnecessary to reassign all data blocks corresponding to the operation, thereby improving the failure recovery performance of the distributed data concurrent processing.

Figure 4:
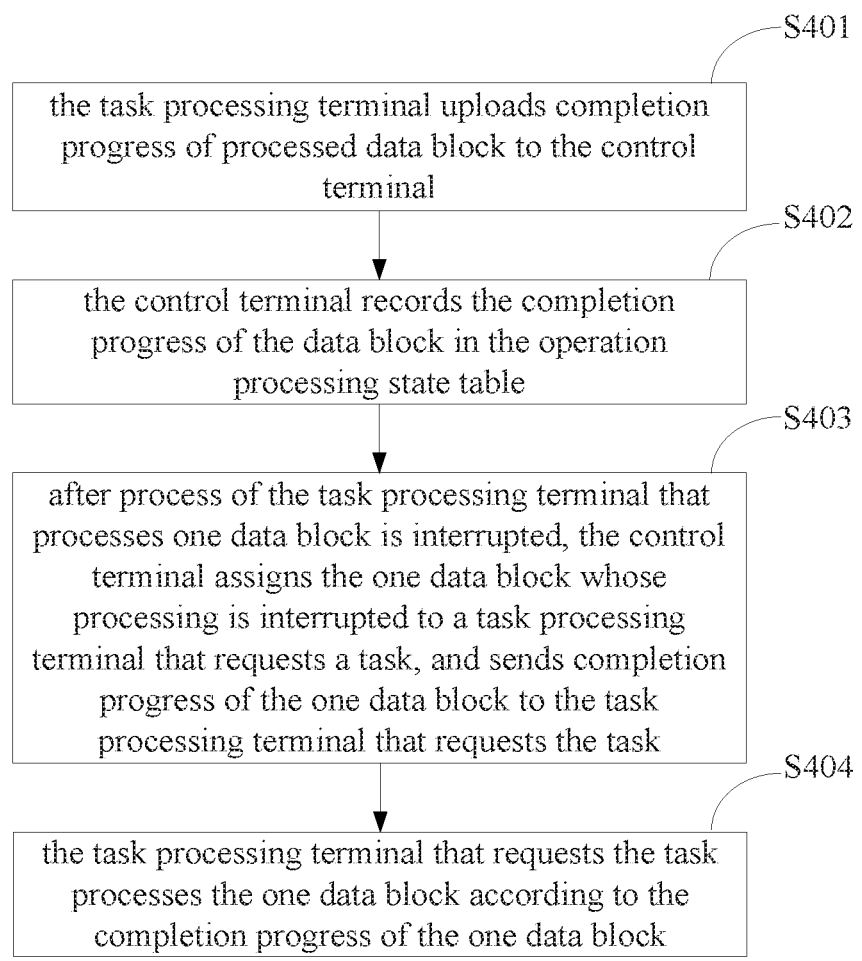
FIG. 4 is a flow diagram of recovery of data block processing interruption according to an embodiment.

As shown in FIG. 4, in an embodiment, the distributed data-based concurrent processing method further includes steps of recovery of data block processing interruption.

Step S401, the task processing terminal uploads completion progress of processed data block to the control terminal.

Specifically, the completion progress can be indicated by a complete data amount. An end of data that are finished can be obtained according to the complete data amount and a beginning of the data block. The end is also a beginning of unprocessed data. In an embodiment, the data block that the task processing terminal processes is a data table, and the completion progress can be number of record that has been processed in the data table.

Step S402, the control terminal records the completion progress of the data block in the operation processing state table.

Specifically, the operation processing state table further includes a field indicating the completion progress of the data block and a field indicating a server tag to which the data block is assigned. The server tag to which the data block is assigned is a server tag that processes the data block. The control terminal can record the completion progress of the data block in a corresponding field in the operation processing state table. The corresponding field is a field of the completion progress corresponding to the server tag where the task processing terminal that uploads the completion progress is located. When processing of the data block is finished, the control terminal can mark the processing state of the data block in a complete state in the operation processing state table.

Step S403, after process of the task processing terminal that processes one data block is interrupted, the control terminal assigns the one data block whose processing is interrupted to a task processing terminal that requests a task, and sends completion progress of the one data block to the task processing terminal that requests the task.

In an embodiment, the task processing terminal uploads the completion progress of the data block to the control terminal in certain frequency, and stores an intermediate processing result obtained from processing the data block and corresponding to the completion progress. Specifically, the intermediate processing result can be stored to a designated location of the server where the data block is located. After hanging or interrupted because of failure, the task processing terminal does not upload the completion progress of the data block to the control terminal any more. When not receiving the completion progress of the date block uploaded by the task processing terminal in a preset period of time, the control terminal can determine that the task processing terminal is in failure. The control terminal can send data information of the data block assigned to the task processing terminal and the completion progress of the data block to a task processing terminal that requests a task. The task processing terminal that requests the task can be the task processing terminal that is rebooted after failure or another task processing terminal.

Step S404, the task processing terminal that requests the task processes the one data block according to the completion progress of the one data block.

Specifically, the task processing terminal can calculate a beginning of unprocessed data in the data block according to the completion progress of the data block, calculate data in the data block from the beginning, and calculate and/or store an intermediate processing result of the data after the beginning according to an intermediate processing result of the data before the beginning. For example, the data block is a data table, and the completion progress of the data table is ten thousand records, then the task processing terminal processes the data in the data table beginning from the ten thousand and first record of the data table.

In the distributed data-based concurrent processing method, the control terminal records the completion progress of every data block. When the task processing terminal processing the data block is in failure, the data block can be assigned to the task processing terminal that requests the task. The task processing terminal that the data block is assigned to processes unprocessed data in the data block according to the completion progress of the data block. It is unnecessary to process the data in the data block from the beginning, thereby increasing the distributed data concurrent processing speed.

In an embodiment, the preset information of the operation includes information that whether the operation is a periodical operation. In the embodiment, the distributed data-based concurrent processing method further includes:

If the operation is a periodical operation, when processing of the data block corresponding to the operation is finished, the control terminal eliminates a record corresponding to the operation in the operation processing state table, marks the operation in an unsuccessfully-initialized state, and moves to the step of obtaining the data block information corresponding to the operation.

In the embodiment, if the operation is a periodical operation, when processing of the data block corresponding to the operation is finished, the record corresponding to the operation in the operation processing state table is eliminated, and the operation is marked in the unsuccessfully-initialized state, and the data block information corresponding to the operation is obtained. Initialization of the next operation automatically begins, and the data block corresponding to the operation is processed. It is unnecessary for a user to submit the operation repeatedly, thereby bringing convenience to operation of the user and increasing a data processing speed.

In an embodiment, the distributed data-based concurrent processing method further includes a step: showing assignment information and completion information of the data block corresponding to the submitted operation. Specifically, the assignment information includes information such as whether the data block being assigned, the server tag where the task processing terminal that is assigned to process the data block is located, etc. The completion information includes information such as complete data amount and/or percentage of the complete data amount.

In the embodiment, showing the assignment information and the completion information of the data block is convenient for the user to check the distributed data concurrent processing status, analyze concurrent processing performance, thereby improving convenience of the user operation.

Following is a specific application example to explain the distributed data-based concurrent processing method.

Figure 5:
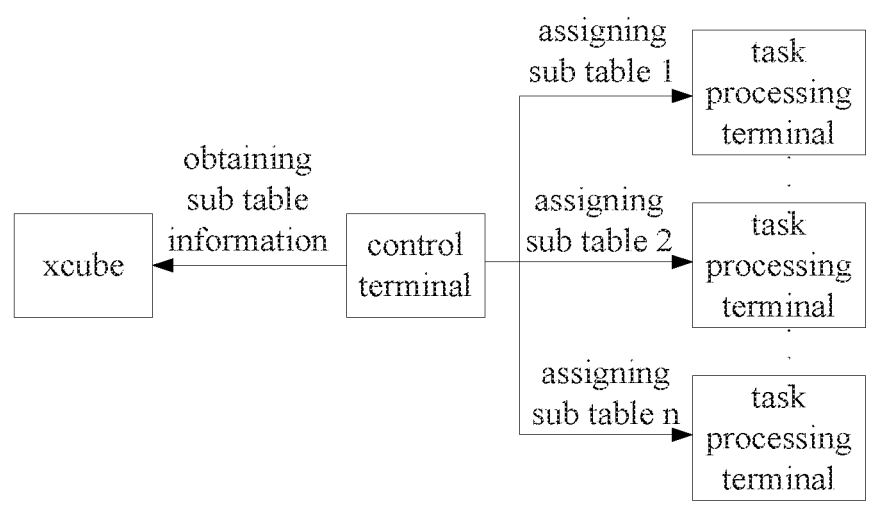
FIG. 5 is a schematic diagram of a distributed data-based concurrent processing method according to an application example.

The control terminal and the task processing terminals are distributed in a data storage server group or a data storage center of xcube database. As show in FIG. 5, the control terminal assigns sub tables that are distributedly stored in different servers and corresponding to a big-data-amount data table in xcube database to the task processing terminals. The task processing terminals concurrently process data of the sub tables assigned to themselves.

Figure 6:
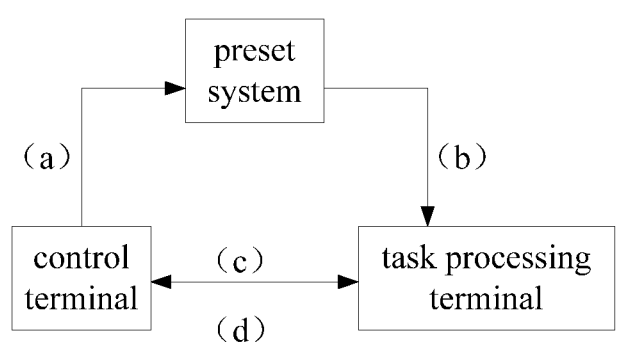
FIG. 6 is a schematic diagram of establishing communication between a control terminal and a task processing terminal according to an embodiment.

In an embodiment, the distributed data-based concurrent processing method includes the following steps:

(1) The control terminal establishes communication with the task processing terminal. As shown in FIG. 6, (a) after the control terminal is powered on, the tag of the control terminal can be written into a preset system that manages control terminal tags. Specifically, the tag of the control terminal consists of a server address where the control terminal is located, a port number of the control terminal and a timestamp. (b) After powered on, the task processing terminal requests the tag of the control terminal from the preset system that manages the control terminal tags. (c) After obtaining the tag of the control terminal, the task processing terminal sends a registration package to the control terminal. (d) After successfully registered, the task processing terminal sends a heartbeat package in a predetermined frequency to the control terminal. The control terminal responses to the heartbeat package. Therefore, a communication between the control terminal and the task processing terminal is established.

(2) The control terminal obtains a name and a key range of xcube data table that is submitted to be processed. Specifically, the key range consists of a start line key value and an end line key value that are to be processed in the data table.

(3) The control terminal obtains sub table information that is to be processed in the xcube database. Specifically, the control terminal obtains a sub table tag, data amount of the sub table and a server IP address where the sub table is located in a routing table of the xcube database and corresponding to the name and the key range of the xcube database that is to be processed. In an embodiment, the sub table tag consists of the name of the xcube database that is to be processed and a start line key value and/or an end line key value corresponding to the sub table.

Further, the control terminal stores the obtained sub table information in an operation processing state table.

Specifically, as shown in Table 1, the operation processing state table includes fields (columns) of a main key, the sub table tag, data amount of the sub table, a server IP address where the sub table is located, a processing state, completion progress and a server IP address that the sub table is assigned to. Specifically, the main key consists of the tag of the control terminal and a sole series number. Specifically, the sole series number is an increasing series number beginning from 1. The sub table tag consists of a data table name of a father data table and the start line key value and/or the end line key value of the sub table. The data amount of the sub table is number of record that the sub table includes. The server IP address where the sub table is located is an IP address of a server storing the sub table. Field values of the processing state include an unassigned state, an assigned state, an error state and a complete state. The server IP address that the sub table is assigned to is a server IP address where a task processing terminal that processes the sub table is located. When the sub table is unassigned, the processing state is an unassigned state. When the task processing terminal that processes the sub table does not upload the completion progress to the control terminal beyond a preset period of time, the processing state is an error state. When all records in the sub table are finished, the processing state is a complete state.

Specifically, after obtaining the sub table information, the control terminal generates a sole series number by increasing from 1, combines the tag of the control terminal with the sole series number to obtain a main key, and stores the main key, a sub table tag, data amount of one obtained sub table and a server IP address where the one obtained sub table is located to the corresponding fields in the operation processing state table.

TABLE 1

| field (column) name | field (column) introduction |
|---|---|
| key | a main key, consisting of a tag of the control terminal and a sole series number |
| table_id | a sub table tag, consisting of a data table name of a father data table and a start line key value and/or an end line key value of the sub table |
| record_num | data amount of the sub table, i.e., number of record that the sub table includes |
| store_ip | a server IP address where the sub table is located, i.e., an IP address of a server storing the sub table |
| status | processing state, including an unassigned state, an assigned state, an error state and a complete state. A default is an unassigned state |
| progress | completion progress, i.e., number of record that has been processed. A default is 0. |
| assign_ip | a server IP address that the sub table is assigned to, i.e., a server IP address where a task processing terminal that processes the sub table is located. A default is null. |

(4) The task processing terminal sends a task processing request to the control terminal.

After receiving the heartbeat package, the control terminal can scan whether there are data blocks that can be assigned, and send a response package indicating there being data blocks that can be assigned if yes. After receiving the response package indicating there being data blocks that can be assigned, the task processing terminal can send the task processing request to the control terminal. The task processing request includes a server IP address where the task processing terminal is located.

(5) The control terminal assigns the sub table that can be assigned to the task processing terminal according to an assigning algorithm.

Before assigning the task, the control terminal ranks the records in the operation processing state table according to store_ip. The records of the same store_ip are ranked according to record_num from large to small.

Figure 7:
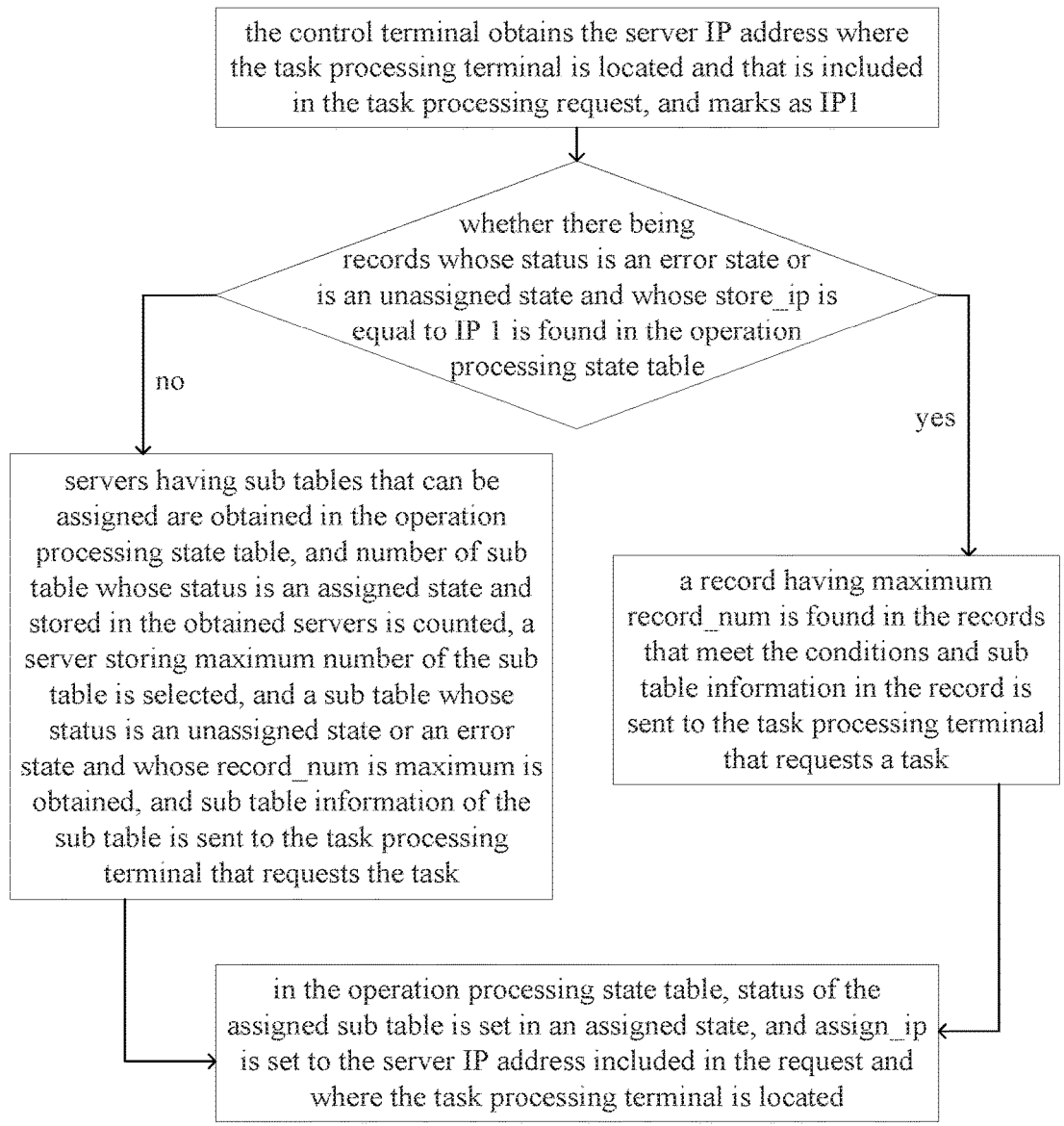
FIG. 7 is a flow diagram of assigning algorithm of a control terminal assigning a task according to an embodiment.

FIG. 7 is a flow diagram of the assigning algorithm. The assigning algorithm follows:

(5-1) the control terminal obtains the server IP address where the task processing terminal is located and that is included in the task processing request, and marks as IP1.

(5-2) whether there being records whose status is an error state or is an unassigned state and whose store_ip is equal to IP 1 is found in the operation processing state table.

(5-3) a record having maximum record_num is found in the records that meet the conditions and sub table information in the record is sent to the task processing terminal that requests a task if there are records whose status is an error state or is an unassigned state and whose store_ip is equal to IP 1 in the operation processing state table.

(5-4) servers (store_ip) having sub tables (sub tables whose status is an unassigned state or an error state) that can be assigned are obtained in the operation processing state table, and number of sub table whose status is an assigned state and stored in the obtained servers is counted, a server (store_ip) storing maximum number of the sub table is selected, and a sub table whose status is an unassigned state or an error state and whose record_num is maximum is obtained, and sub table information of the sub table is sent to the task processing terminal that requests the task if there are no records whose status is an error state or an unassigned state and whose store_ip is equal to IP 1 in the operation processing state table.

(5-5) the sub table information sent to the task processing terminal includes: table_id, store_ip and progress.

In the operation processing state table, status of the assigned sub table is set in an assigned state, and assign_ip is set to the server IP address included in the request and where the task processing terminal is located.

(6) The task processing terminal receives the sub table information sent by the control terminal and processes sub table data according to the sub table information. Specifically, the task processing terminal establishes communication with the server (a server corresponding to store_ip) where the sub table is located, and processes to-be-processed records in the sub table according to the completion progress (progress) of the sub table.

(7) the task processing terminal uploads the completion progress of the sub table, i.e., number of record that has been processed to the control terminal in a predetermined frequency.

(8) After receiving the uploaded completion progress, the control terminal records the uploaded completion progress to progress field corresponding to the sub table in the operation processing state table.

Set status of the sub table in a complete state if the completion progress is equal to record_num of the sub table.

If not receiving the completion progress uploaded by the task processing terminal that processes the sub table beyond a preset period of time, the control terminal sets status of the sub table in an error state.

In the distributed data-based concurrent processing method, the control terminal records the completion progress of each data block. When the task processing terminal that processes one data block is in failure, the control terminal can assign the data block to a task processing terminal that requests a task. The task processing terminal that the data block is assigned to processes to-be-processed data of the data block according to the completion progress of the data block. It is unnecessary to process the data of the data block from the beginning, thereby increasing a distributed data concurrent processing speed.

If the control terminal hangs or is interrupted because of failure, after rebooted, the control terminal needs to obtain the name and the key range of xcube data table that is submitted to be processed again, reassign the sub table corresponding to the name and the key range of xcube data table that is to be processed to the task processing terminal. The task processing terminal also needs to process the sub table data again. Therefore, the failure recovery mechanism needs to establish.

Figure 8:
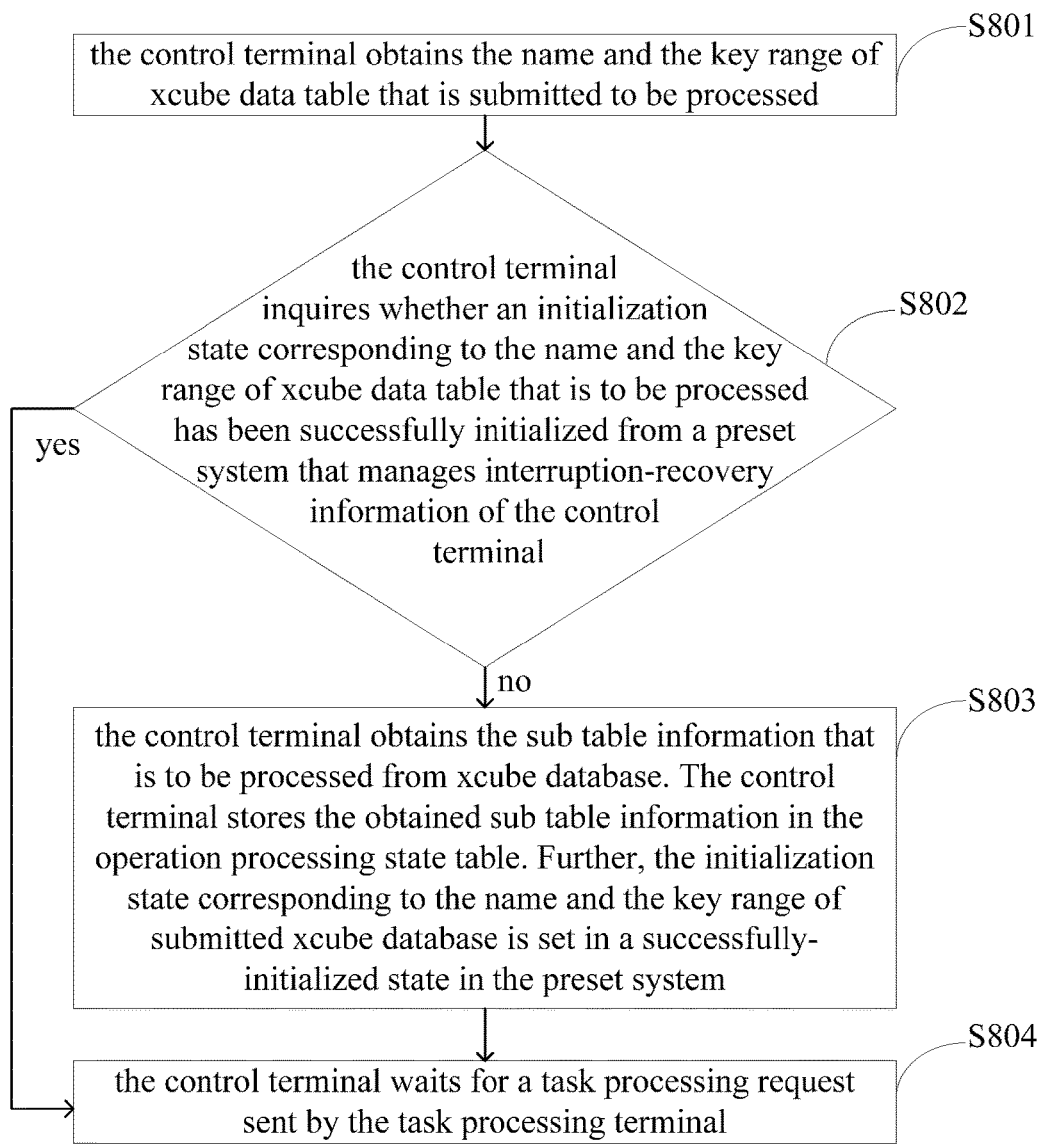
FIG. 8 is an initialization step included by a distributed data-based concurrent processing method according to an embodiment.

In an embodiment, as shown in FIG. 8, the distributed data-based concurrent processing method includes the following initialization steps:

Step S801, the control terminal obtains the name and the key range of xcube data table that is submitted to be processed.

Step S802, the control terminal inquires whether an initialization state corresponding to the name and the key range of xcube data table that is to be processed has been successfully initialized from a preset system that manages interruption-recovery information of the control terminal.

Specifically, the preset system that manages interrupt-recovery information of the control terminal stores the initialization state corresponding to the name and the key range of xcube data table. The initialization state includes a successfully-initialized state and an unsuccessfully-initialized state.

If it is an unsuccessfully-initialized state, it indicates that the control terminal is initially powered on, and initializing the submitted operation is needed. If it is a successfully-initialized state, it indicates that the control terminal hangs or is interrupted previously because of failure, and when the control terminal is rebooted currently, initializing the submitted operation is not needed.

Step S803 is executed if it is an unsuccessfully-initialized state. Step S804 is executed if it is a successfully-initialized state.

Step S803, the control terminal obtains the sub table information that is to be processed from xcube database. The control terminal stores the obtained sub table information in the operation processing state table. Further, the initialization state corresponding to the name and the key range of submitted xcube database is set in a successfully-initialized state in the preset system that manages interrupt-recovery information of the control terminal.

Step S804, the control terminal waits for a task processing request sent by the task processing terminal.

After receiving the task processing request sent by the task processing terminal, enter step (5).

In the distributed data-based concurrent processing method, the control terminal records the sub table information and the processing state of the sub table corresponding to the name and the key range of the submitted xcube data table in the operation processing state table, and assigns the sub table to the task processing terminal according to the processing state of the sub table in the operation processing state table. If the control terminal hangs or is interrupted because of failure, after rebooted, the control terminal still assigns the sub table according to the processing state of the sub table corresponding to the name and the key range of the submitted xcube data table in the operation processing state table. It is unnecessary to reassign all sub tables, thereby improving the failure recovery performance of the distributed data concurrent processing.

If the data corresponding to the name and the key range of the submitted xcube data table is a periodical operation that needs to be processed repeatedly, then the user needs to submit the operation repeatedly (i.e., submit the name and the key range of the xcube data table) to activate the control terminal and the task processing terminal to assign and process the operation. This will increase workload of the operation. Accordingly, it is necessary to provide a distributed data-based concurrent processing method capable of processing the periodical operation repeatedly.

After step (8), the distributed data-based concurrent processing method can determine whether the data corresponding to the name and the key range of the submitted xcube data table is a periodical operation. Property of whether the data being a periodical operation is inputted when the user submits the operation.

If it is a periodical operation, then when status of the sub table corresponding the name and the key range of xcube data table in the operation processing state table is a complete state, all records corresponding to the name and the key range of xcube data table in the operation processing state table are eliminated, i.e., all records of the tag of the control terminal included in the main key are eliminated, and the initialization state corresponding to the name and the key range of xcube data table in the preset system that manages interrupt-recovery information of the control terminal is marked in an unsuccessfully-initialized state. Further, move to step (3) to enter next sub table assignment process. If it is not a periodical operation, then it ends.

The distributed data-based concurrent processing method can automatically enter next operation initialization process and assign the operation when processing of the operation is finished if the operation is a periodical operation. It is unnecessary for a user to submit the operation repeatedly, thereby bringing convenience to operation of the user and increasing data processing speed.

Figure 9:
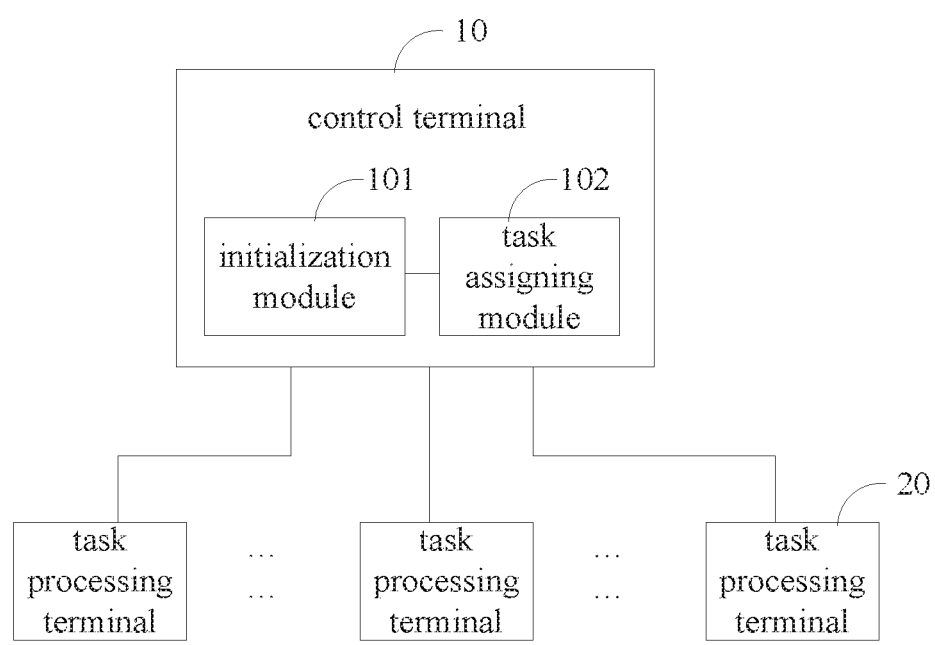
FIG. 9 is a block diagram of a distributed data-based concurrent processing system according to an embodiment.

As shown in FIG. 9, in an embodiment, a distributed data-based concurrent processing system includes a control terminal 10 and a number of task processing terminals 20. The control terminal includes an initialization module 101 and a task assigning module 102.

The initialization module 101 is configured to obtain data block information corresponding to a submitted operation.

Specifically, a data block corresponding to the operation can be a file block or a data table distributedly stored in a number of servers. In an embodiment, the data block information includes a data tag, data amount of the data block and a server tag where the data block is located. Specifically, the data block tag can be a storage address of the file block or a table name of the data table. The server tag can be a server IP address.

In an embodiment, the initialization module 101 can obtain the data block information corresponding to the submitted operation from a data management system that manages the data block corresponding to the submitted operation.

In an embodiment, the submitted operation can be a data table of xcube database, and a data table name and a key range in the data table are used for tags to indicate that records within the key range in the data table are to-be-processed operation. The key range consists of a start line key value and an end line key value that are to be processed in the data table. The initialization module 101 can find the sub table information in a routing table where xcube stores the sub table information according to the data table name and the key range to obtain the start line key value, the end line key value, the data amount of the sub table and the server tag wherein the sub table is located corresponding to the operation. In an embodiment, the sub table tag consists of the data table name and the start line key value and/or the end line key value corresponding to the sub table.

The task processing terminal 20 sends a task processing request to the control terminal 10.

In an embodiment, after the control terminal 10 is powered on, a tag of the control terminal 10 can be written into a designated file or can be sent to a preset system that manages control terminal tags. Specifically, the tag of the control terminal 10 can consist of a server address where the control terminal 10 is located, a port number of the control terminal 10 and a timestamp. After the task processing terminal 20 is powered on, the tag of the control terminal 10 can be read from the designated file or can be obtained from the preset system that manages the control terminal tags. After obtaining the tag of the control terminal 10, the task processing terminal 20 can send a registration package to the control terminal 10. After successfully registered, the task processing terminal 20 can send a heartbeat package in a predetermined frequency to the control terminal 10. After receiving the heartbeat package, the control terminal 10 can scan whether there are data blocks that can be assigned, and if yes, send a response package indicating there being data blocks that can be assigned to the task processing terminal 20. After receiving the response package indicating there being data blocks that can be assigned, the task processing terminal 20 can send the task processing request to the control terminal 10.

Specifically, the task processing request includes a server tag where the task processing terminal 20 is located. Specifically, the server tag is an IP address of a server.

The task assigning module 102 finds a data block that is unassigned and is distributed in the same server where the task processing terminal 20 is distributed, and assigns found data block to the task processing terminal 20.

In an embodiment, the control terminal 10, the task processing terminal 20 and the data block corresponding to the submitted operation are distributed in the same server group or in the same data processing center. The task processing terminal 20 and the data block corresponding to the operation may be distributed in the same server.

Specifically, the control terminal 10 can find the data block that is unassigned and is distributed in the same server where the task processing terminal is distributed in data block information corresponding to the operation. Preferably, the control terminal 10 can find a data block with the biggest data amount in data blocks that are unassigned and are distributed in the same server where the task processing terminal 20 is distributed. In the embodiment, processing the data block with the biggest data amount in priority can avoid a long-tail effect, thereby increasing an entire concurrent processing speed. The so-called long-tail effect means that: it takes a long time to finish a few last-left data blocks with big data amount, and one data block is processed by one task processing terminal 20, and only a few task processing terminals 20 work within a long time that it takes to process the last-left data blocks, and most of the task processing terminals 20 may be idle. This causes a low degree of concurrency, thereby reducing the entire processing speed.

Specifically, the control terminal 10 can send a data block tag, a data amount of a found data block and a server tag where the found data block is located to the task processing terminal 20.

The task assigning module 102 is further configured to count a server having the fewest data blocks that are being processed by the task processing terminal 20 and assigning an unassigned data block on the server to the task processing terminal 20 if the data block that is unassigned and is distributed in the same server where the task processing terminal 20 is distributed is unfound.

Preferably, the control terminal 10 can assign a data block with the biggest data amount on the server having the fewest data blocks that are being processed by the task processing terminal 20 to the task processing terminal 20. For the same reason, in the embodiment, assigning the data block with the biggest data amount to the task processing terminal 20 in priority can avoid the long-tail effect, thereby increasing the entire speed of the concurrent processing.

The task processing terminal 20 is further configured to process the data block assigned by the control terminal 10 according to a preset flow.

Specifically, after receiving the data block information sent by the control terminal 10, the task processing terminal 20 can establish communication with a server where the data block is located, process data in the data block according to the preset flow and store an intermediate processing result and a final processing result.

In an embodiment, the initialization module 101 is configured to obtain preset information of the submitted operation, check whether the operation has been successfully initialized, and if not, obtain data block information corresponding to the operation, store the data block information corresponding to the operation into a preset operation processing state table, record the data block in an unassigned state in the operation processing state table, and mark the operation in a successfully-initialized state. In an embodiment, if the operation is unsuccessfully-initialized, the initialization module 101 can wait a task processing request sent by the task processing terminal.

Specifically, the preset information of the operation includes an operation tag. In an embodiment, the submitted operation can be a data table of xcube database. The operation tag consists of a data table name and a key range in the data table. Records within which segment of the key range in which data table can be determined as to-be-processed operation according to the operation tag.

In an embodiment, the initialization module 101 can determine whether the operation corresponding to the preset information in the designated file is marked in a successfully-initialized state. In another embodiment, the initialization module 101 can inquire whether the operation corresponding to the preset information has been successfully initialized from a preset system that manages interruption-recovery information of the control terminal. Specifically, the preset system that manages interrupt-recovery information of the control terminal and the preset system that manages the control terminal tags are the same system.

Specifically, the operation processing state table includes fields (columns): main key, data block tag, data amount of data block, server tag where the data block is located and a processing state. In an embodiment, the main key of the operation processing state table can consist of the tag of the control terminal 10 and a sole series number. Specifically, the sole series number of the data block is an increasing series number beginning from 1. In an embodiment, field value of the processing state includes an unassigned state, an assigned state, an error state and a complete state. If the operation is unsuccessfully initialized, the initialization module 101 can store data block information of each data block into a field corresponding to one record in the operation processing state table, generate the sole series number of the data block by increasing from 1, combine the tag of the control terminal 10 with the sole series number to obtain the main key of the record and mark the processing state of the record in "unassigned state".

In the embodiment, after the control terminal 10 is powered on, the initialization module 101 firstly checks whether the submitted operation has been successfully initialized. If not, it indicates that the control terminal 10 is initially powered on, and then the initialization module 101 initializes the operation. If the submitted operation has been successfully initialized, it indicates that the control terminal 10 hangs or is interrupted previously because of failure when processing the operation, and when the control terminal 10 is powered on again currently, initializing the submitted operation is not needed.

In the embodiment, the task assigning module 102 is configured to find the data block that is unassigned and is distributed in the same server where the task processing terminal is distributed in data blocks corresponding to the operation in the operation processing state table and assign found data block to the task processing terminal 20.

Specifically, the task assigning module 102 can find a record that is in an unassigned state and whose server tag where the data block is located in the operation processing state table is the same as the server where the task processing terminal 20 is located and included in the task processing request, and send data information in the found record to the task processing terminal 20.

The task assigning module 102 is further configured to count a server having the fewest data blocks that are being processed by the task processing terminal according to the operation processing state table, and assigns an unassigned data block on the server and in the operation processing state table to the task processing terminal 20 if the data block that is unassigned and is distributed in the same server where the task processing terminal is distributed is unfound.

Specifically, the task assigning module 102 can count number of record whose processing state corresponding to the server tag where each data block is located is an assigned state, obtain a server having the fewest number of record correspondingly in servers having unassigned data blocks, further send data block information of the unassigned data block on the server to the task processing terminal 20. Preferably, data block information of an unassigned data block with the smallest data amount is sent to the task processing terminal 20.

Figure 10:
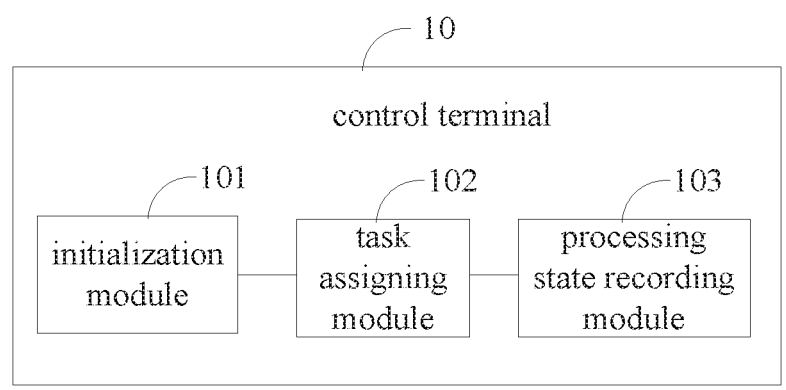
FIG. 10 is a block diagram of a control terminal according to an embodiment.

As shown in FIG. 10, in the embodiment, the control terminal 10 further includes a processing state recording module 103 configured to record the data block in an assigned state in the operation processing state table after the task assigning module 102 assigns the data block.

Specifically, the processing state recording module 103 can set field of the processing state in the record corresponding to the data block in "assigned state". In an embodiment, the operation processing state table further includes a field that is used for recording a server tag where the task processing terminal 20 that the data block is assigned to is located. After the task assigning module 102 assigns the data block, the processing state recording module 103 can record the server tag where the task processing terminal 20 that the data block is assigned to is located into the field correspondingly in the operation processing state table.

In the distributed data-based concurrent processing system, the control terminal 10 records the data block information and the processing state of the data block corresponding to the submitted operation in the operation processing state table, and assigns the data block to the task processing terminal 20 according to the processing state of the data block in the operation processing state table. If the control terminal 10 hangs or is interrupted because of failure, after powered on again, the control terminal 10 still assigns the data block according to the processing state of the data block corresponding to the operation in the operation processing state table. It is unnecessary to reassign all data blocks corresponding to the operation, thereby improving the failure recovery performance of the distributed data concurrent processing.

In an embodiment, the task processing terminal 20 is further configured to upload completion progress of processed data block to the control terminal 10.

Specifically, the completion progress can be indicated by a complete data amount. An end of data that are finished can be obtained according to the complete data amount and a beginning of the data block. The end is also a beginning of unprocessed data. In an embodiment, the data block that the task processing terminal 20 processes is a data table, and the completion progress can be number of record that has been processed in the data table.

The processing state recording module 103 is further configured to record the completion progress of the data block in the operation processing state table.

Specifically, the operation processing state table further includes a field indicating the completion progress of the data block and a field indicating a server tag to which the data block is assigned. The server tag to which the data block is assigned is a server tag that processes the data block. The processing state recording module 103 can record the completion progress of the data block in a corresponding field in the operation processing state table. The corresponding field is a field of the completion progress corresponding to the server tag where the task processing terminal that uploads the completion progress is located. When processing of the data block is finished, the processing state recording module 103 can mark the processing state of the data block in a complete state in the operation processing state table.

The task assigning module 102 is further configured to after process of the task processing terminal 20 that processes one data block is interrupted, assign the one data block whose processing is interrupted to a task processing terminal that requests a task, and send completion progress of the one data block to the task processing terminal 20 that requests the task.

In an embodiment, the task processing terminal 20 uploads the completion progress of the data block to the control terminal 10 in certain frequency, and stores an intermediate processing result obtained from processing the data block and corresponding to the completion progress. Specifically, the intermediate processing result can be stored to a designated location of the server where the data block is located. After hanging or interrupted because of failure, the task processing terminal 20 does not upload the completion progress of the data block to the control terminal 10 anymore. When not receiving the completion progress of the date block uploaded by the task processing terminal 20 in a preset period of time, the task assigning module 102 can determine that the task processing terminal 20 is in failure. The task assigning module 102 can send data information of the data block assigned to the task processing terminal 20 and the completion progress of the data block to a task processing terminal 20 that requests a task. The task processing terminal 20 that requests the task can be the task processing terminal 20 that is rebooted after failure or another task processing terminal 20.

The task processing terminal 20 is further configured to process the one data block according to the completion progress of the one data block.

Specifically, the task processing terminal 20 can calculate a beginning of unprocessed data in the data block according to the completion progress of the data block, calculate data in the data block from the beginning, and calculate and/or store an intermediate processing result of the data after the beginning according to an intermediate processing result of the data before the beginning. For example, the data block is a data table, and the completion progress of the data table is ten thousand records, then the task processing terminal 20 processes the data in the data table beginning from the ten thousand and first record of the data table.

In the distributed data-based concurrent processing system, the control terminal 10 records the completion progress of every data block. When the task processing terminal 20 processing the data block is in failure, the data block can be assigned to the task processing terminal 20 that requests the task. The task processing terminal 20 that the data block is assigned to processes unprocessed data in the data block according to the completion progress of the data block. It is unnecessary to process the data in the data block from the beginning, thereby increasing the distributed data concurrent processing speed.

Figure 11:
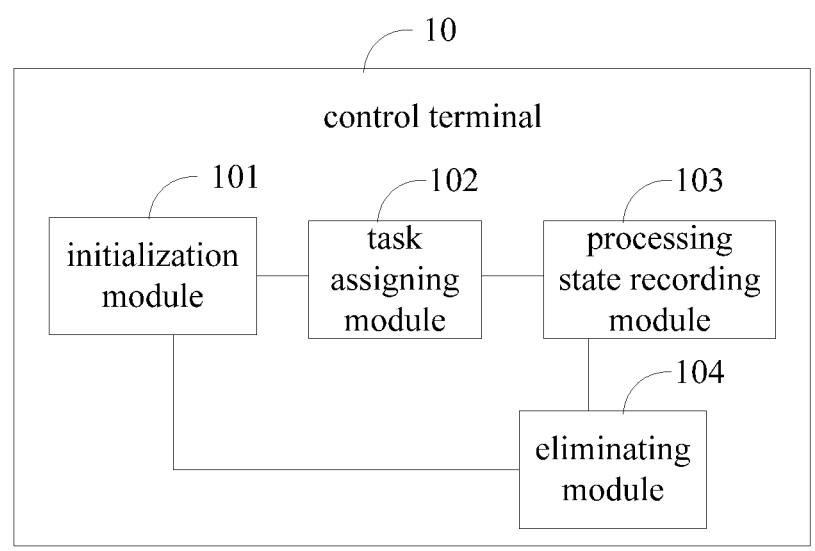
FIG. 11 is a block diagram of a control terminal according to another embodiment.

In an embodiment, the preset information of the operation includes information that whether the operation is a periodical operation. As shown in FIG. 11, in the embodiment, the control terminal 10 further includes an eliminating module 104 configured to when processing of the data block corresponding to the operation is finished, eliminate a record corresponding to the operation in the operation processing state table, mark the operation in an unsuccessfully-initialized state, and inform the initialization module 101 to obtain the data block information corresponding to the operation if the operation is a periodical operation.

In the embodiment, if the operation is a periodical operation, when processing of the data block corresponding to the operation is finished, the record corresponding to the operation in the operation processing state table is eliminated, and the operation is marked in the unsuccessfully-initialized state, and the initialization module 101 is informed to obtain the data block information corresponding to the operation. Initialization of the next operation automatically begins, and the data block corresponding to the operation is processed. It is unnecessary for a user to submit the operation repeatedly, thereby bringing convenience to operation of the user and increasing a data processing speed.

In an embodiment, the distributed data-based concurrent processing system further includes a show terminal (not shown in figures) configured to show assignment information and completion information of the data block corresponding to a submitted operation. Specifically, the assignment information includes information such as whether the data block being assigned, the server tag where the task processing terminal 20 that is assigned to process the data block is located, etc. The completion information includes information such as complete data amount and/or percentage of the complete data amount.

In the embodiment, showing the assignment information and the completion information of the data block is convenient for the user to check the distributed data concurrent processing status, analyze concurrent processing performance, thereby improving convenience of the user operation.

Those skilled in the art should understand that whole or part of the methods in the embodiments could be carried by corresponding hardware instructed by computer programs; such programs could be stored in a computer-readable storage medium. When such programs are executed, the process of the methods in the embodiments is included. The storage medium can be magnetic disk, optical disk, read-only memory (ROM), or random access memory (RAM), etc.

The above described embodiments explains only several exemplary embodiments of the present invention; the descriptions are specified and detailed, while shall not be understood as to limit the invention to the precise forms disclosed. It shall be mentioned that for those skilled in the art, alternative embodiments could be made to which the present invention pertains without departing from its spirit and scope. Accordingly, the scope of the present invention is defined by the appended claims rather than the foregoing description and the exemplary embodiments described therein.

What is claimed is:

1. A method of implementing functions of a control terminal and task processing terminals on servers to deploy the control terminal and the task processing terminals in the servers to execute distributed data-based concurrent processing, the method comprising:
  obtaining, by the control terminal, data block information corresponding to at least one operation to be submitted;
  sending, by a task processing terminal, among the task processing terminals, a task processing request to submit an operation, among the at least one operation, to the control terminal;
  assigning, by the control terminal, a data block, among data blocks, found corresponding to data block information of an operation among the at least one operation that is unassigned for processing, to a task processing terminal among the task processing terminals that is distributed in same server among the servers where the found unassigned data block is distributed; and
  in response to the unassigned data block not being found in the assigning, determining, by the control terminal, a server among the servers having fewest data blocks that are being processed according to the data block information of the at least one operation and assigning the found unassigned data block to a task processing terminal among the task processing terminals on the determined server,
  the data blocks assigned by the control terminal to the task processing terminals being process-able according to a set flow;
  wherein the assigning, by the control terminal, the found unassigned data block that is distributed in the same server where the task processing terminal is deployed, further comprises:
    obtaining, by the control terminal, initialization information set for the operation;
    checking, by the control terminal, based upon the set initialization information for the operation whether the operation has been initialized,
    if the operation is not initialized, after obtaining the data block information corresponding to the operation,
    storing the data block information corresponding to the operation into an operation processing state table,
    recording the data block in an unassigned state in the operation processing state table, and
    marking the operation in the initialization information in a successfully-initialized state, and
    if the operation is initialized, waiting for receipt of a task processing request sent by a task processing terminal among the task processing terminals.

2. The method of claim 1, wherein the assigning of the found unassigned data block that is in the same server where the task processing terminal is distributed comprises:
  assigning, by the control terminal, an unassigned data block with biggest data amount found from among unassigned data blocks corresponding to the data block information of the at least one operation and that are distributed in the same server where the task processing terminal is distributed.

3. The method of claim 1, wherein the assigning of the unassigned data block to the determined server with the fewest data blocks being processed, comprises:
  assigning an unassigned data block with biggest data amount to the task processing terminal on the determined server with the fewest data blocks being processed.

4. The method of claim 1, wherein
  the assigning, by the control terminal, the found unassigned data block that is in the same server where the task processing terminal is deployed comprises:
  finding, by the control terminal, the data block corresponding to the operation that is unassigned and is distributed in the same server where the task processing terminal is distributed, from among data blocks corresponding to the at least one operation in the operation processing state table and assigning the found unassigned data block to the task processing terminal that is distributed in the same server where the found unassigned data block is distributed;
  the determining, by the control terminal, the server having the fewest data blocks that are being processed and assigning an unassigned data block to the task processing terminal on the determined server comprises:
  determining, by the control terminal, a server having the fewest data blocks that are being processed according to the operation processing state table, and assigning an unassigned data block to the task processing terminal on the determined server;
  the method further comprises:
  recording, by the control terminal, the assigned data block in an assigned state in the operation processing state table.

5. The method of claim 1, further comprising:
  uploading, by the task processing terminal, completion progress of one data block to the control terminal;
  recording, by the control terminal, the completion progress of the one assigned data block in the operation processing state table;
  when process of the task processing terminal processing the one assigned data block is interrupted, reassigning, by the control terminal, the one assigned data block which processing is interrupted to a task processing terminal that requests a task to be processed and sending the completion progress of the one reassigned data block to the task processing terminal that requests the task, thereby the one reassigned data block is process-able according to the completion progress of the one reassigned data block by the task processing terminal that requests the task.

6. The method of claim 1, wherein the initialization information set for the operation comprises information of whether the operation is a periodical operation; and
  the method further comprises:
  if the operation is a periodical operation, when processing of a data block corresponding to the periodical operation is finished, performing, by the control terminal,
  eliminating a record corresponding to the periodical operation in the operation processing state table,
  marking the periodical operation in the initialization information in an unsuccessfully-initialized state, and
  obtaining the data block information corresponding to the periodical operation.

7. A system, comprising:
  a plurality of servers, each server comprising:
  at least one non-transitory computer readable storage medium to store programs; and at least one computer hardware configured, including configured by the programs, to execute a distributed data-based concurrent processing, at least two servers among the plurality of servers in which a plurality of task processing terminals are deployed; and at least one server among the plurality of servers in which a control terminal is deployed, a task processing terminal, among the task processing terminals, to send a task processing request to submit an operation to the control terminal; and the control terminal is to, execute an initialization to obtain data block information corresponding to the operation to be submitted by the task processing terminal;

assign a data block, among data blocks, found corresponding to data block information of an operation among the at least one operation that is unassigned for processing, to a task processing terminal, among the task processing terminals, that is distributed in same server among the servers where the found unassigned data block is distributed; and in response to the unassigned data block not being found in the assigning, determine a server among the servers having fewest data blocks that are being processed according to the data block information of at least one operation, and assign the found unassigned data block to a task processing terminal among the task processing terminals on the determined server, the data blocks assigned by the control terminal to the task processing terminals being process-able according to a preset flow;

wherein the initialization is to:

obtain initialization information set for the operation, check based upon the set initialization information for the operation whether the operation has been initialized, if the operation is not initialized, after obtaining the data block information corresponding to the operation, store the data block information corresponding to the operation into an operation processing state table, record the data block in an unassigned state in the operation processing state table, and mark the operation in the initialization information in a successfully-initialized state, and if the operation is initialized, waiting for receipt of a task processing request sent by a task processing terminal among the task processing terminals.

8. The system of claim 7, wherein the control terminal is to assign an unassigned data block with biggest data amount found from among unassigned data blocks corresponding to the data block information of the at least one operation and that are distributed in the same server where the task processing terminal is distributed.

9. The system of claim 7, wherein the control terminal is to further assign an unassigned data block with biggest data amount on the determined server with the fewest data blocks being processed.

10. The system of claim 7, wherein the control terminal is to, find the data block corresponding to the operation that is unassigned and is distributed in the same server where the task processing terminal is deployed, from among data blocks corresponding to the at least one operation in the operation processing state table and assigning the found unassigned data block to the task processing terminal that is distributed in the same server where the found unassigned data block is distributed;

to determine the server having the fewest data blocks that are being processed according to the operation processing state table, and assign an unassigned data block to the task processing terminal on the determined server; and to record the assigned data block in an assigned state in the operation processing state table.

11. The system of claim 10, wherein the task processing terminal is to further upload completion progress of one assigned data block to the control terminal; and the control terminal is to further record the completion progress of the one assigned data block in the operation processing state table; and when process of the task processing terminal processing the one assigned data block is interrupted, reassign the one assigned data block which processing is interrupted to a task processing terminal that requests a task to be processed and send the completion progress of the one reassigned data block to the task processing terminal that requests the task, thereby the one reassigned data block is process-able according to the completion progress of the one reassigned data block by the task processing terminal that requests the task.

12. The system of claim 11, wherein the initialization information set for the operation comprises information of whether the operation is a periodical operation; and the control terminal is further to, when processing of a data block corresponding to the periodical operation is finished, eliminate a record corresponding to the periodical operation in the operation processing state table, mark the periodical operation in an unsuccessfully-initialized state, and obtain the data block information corresponding to the periodical operation.

13. At least one non-transitory computer readable storage media comprising executable instructions to implement functions of a control terminal and task processing terminals on servers to deploy the control terminal and the task processing terminals in the servers to execute a distributed data-based concurrent processing by:

obtaining, by the control terminal, data block information corresponding to at least one operation to be submitted;

sending, by a task processing terminal, among the task processing terminals, a task processing request to submit an operation, among the at least one operation, to the control terminal;

assigning, by the control terminal, a data block, among data blocks, found corresponding to data block information of an operation among the at least one operation that is unassigned for processing, to a task processing terminal among the task processing terminals that is distributed in same server among the servers where the found unassigned data block is distributed;

in response to the unassigned data block not being found in the assigning, determining, by the control terminal, a server among the servers having fewest data blocks that are being processed according to the data block information of the at least one operation and assigning the found unassigned data block to a task processing terminal among the task processing terminals on the determined server, the data blocks assigned by the control terminal to the task processing terminals being process-able according to a set flow;

wherein the assigning, by the control terminal, the found unassigned data block that is distributed in the same server where the task processing terminal is deployed, further comprises:

obtaining, by the control terminal, initialization information set for the operation;

checking, by the control terminal, based upon the set initialization information for the operation whether the operation has been initialized, if the operation is not initialized, after obtaining the data block information corresponding to the operation, storing the data block information corresponding to the operation into an operation processing state table, recording the data block in an unassigned state in the operation processing state table, and marking the operation in the initialization information in a successfully-initialized state, and if the operation is initialized, waiting for receipt of a task processing request sent by a task processing terminal among the task processing terminals.

* * * * *